United States Patent [19]

Clement

[11] 3,767,267

[45] Oct. 23, 1973

[54] HEAVY DUTY WHEEL AND WHEEL CENTER

[76] Inventor: Richard H. Clement, 10900 Jann Ct., La Grange, Ill. 60525

[22] Filed: Jan. 12, 1972

[21] Appl. No.: 217,214

[52] U.S. Cl. .............................. 301/6 CS, 301/63 R
[51] Int. Cl. ............................................... B60b 1/06
[58] Field of Search ............ 301/63 R, 63 D, 9 DN, 301/10 R, 6 CS, 36 R, 64 SD

[56] References Cited
UNITED STATES PATENTS

| | | | |
|---|---|---|---|
| 1,341,465 | 5/1920 | Hoffman | 301/63 R |
| 1,175,315 | 3/1916 | Smith | 301/64 SC |
| 1,867,095 | 7/1932 | Prescott | 301/63 R |
| 2,053,367 | 9/1936 | Hamill | 301/6 CS |
| 2,584,309 | 2/1952 | Voorhees | 301/63 R |
| 2,698,566 | 1/1955 | Stough | 301/36 R |
| 3,547,494 | 12/1970 | LeJeune | 301/64 SD |
| 3,131,972 | 5/1964 | Walton | 301/9 DN |

FOREIGN PATENTS OR APPLICATIONS

| | | | |
|---|---|---|---|
| 113,815 | 3/1918 | Great Britain | 301/63 R |

Primary Examiner—Richard J. Johnson
Assistant Examiner—Reinhard Eisenzopf
Attorney—Charles J. Merriam et al.

[57] ABSTRACT

A heavy duty wheel is made up of a disc wheel center and a rim, wherein the disc has a substantially flat central web portion surrounded by an annular outer portion, offset at an angle about 35° from the plane of said central web portion. The central web portion is reinforced by a reinforcing plate welded thereto. The central web portion is adapted to be bolted to the hub by studs. Both the central web portion and reinforcing plate have holes which match up to the studs, and the holes are surrounded by a coined boss. The outer portion of the disc preferably has openings therein, radially aligned with each hole in the central web portion, said openings having flanges projecting from their peripheries.

14 Claims, 5 Drawing Figures

Patented Oct. 23, 1973

3,767,267

HEAVY DUTY WHEEL AND WHEEL CENTER

The present invention is directed to heavy duty wheels and wheel centers, particularly useful for mounting racing tires on racing vehicles, which can withstand large lateral forces without failure and which represent a major improvement over the prior art.

Disc wheels in general are well known. Disc wheels are made up of rims which are secured to wheel center discs, the discs being adapted to be secured to axle hubs by bolting to the hub. Such wheels have been described in the prior art, including U.S. Pat. No. 1,329,527, U.S. Pat. No. 1,358,850 and U.S. Pat. No. 2,597,835. Further, the prior art has described the use of a coined out boss surrounding the hole in the disc through which the studs pass. The prior art has described, in general, wheels in which the outer portion of the disc is set at an angle different than the central portion of the disc. Further, wheels have been described in the prior art which have openings of various sizes and shapes in the outer portion of the disc. However, the prior art has failed to describe a wheel which contains all of the elements of the present invention, described below. As a result, the prior art wheels do not possess the durability and freedom from cracking and other types of metal failure, achieved by the wheels of the present invention.

In automobile racing, as the automobiles are steered through turns at high speed, tremendous lateral forces are developed by the centrifugal force of the automobile. These centrifugal forces are linked to the tires in contact with the roadway, and ultimately the forces must be transmitted by the wheels causing consistant failure of wheels of ordinary construction. Attempts to produce stronger wheels have for the most part included forming wheels and wheel centers from thicker materials which are more difficult to shape and consequently more expensive to work with. Further, as a rule, thicker materials do not allow for desirable controlled flexing of outer wheel center portions.

The present invention is based on the discovery that a light weight disc wheel which gives superior performance as a racing wheel may be produced from a disc which has its central web portion reinforced with a reinforcing plate, wherein both the central web portion and the reinforcing plate are coined to produce bosses around the stud holes. The outer, annular portion of the disc is substantially flat and offset from the plane of the central web portion of the disc by approximately 35°. The reinforcing plate extends beyond the central web portion and overlaps a part of the outer portion. Preferably the outer portion of the disc has openings radially aligned with the stud openings in the central web portion and reinforcing plate.

Preferably, the openings in the annular portion of the disc are roughly kidney-shaped, that is, they are elongated in a direction at right angles to the radius. Also, it is preferable that the openings in the annular portion of the disc have a flange projecting at about 90° therefrom, strengthening and providing for controlled flexing of the annular portion. The openings in the annular portion of the disc not only reduce the entire weight of the wheel but at the same time they cool the brake mechanism. It is essential, however, when such openings are employed that they be radially aligned with the stud openings so that the forces on the wheel center developed at the stud openings may be distributed uniformly throughout the annular portion and reduce direct load on the mounting stud.

In the wheels of the present invention, the studs are fitted through the reinforced central web portion of the disc and lug nuts are screwed down into contact with the raised bosses. The bosses are preferably about the same height as is the thickness of the material from which the disc is made. In the preferred embodiment, the material from which the disc is fabricated is 3/16 inch thick, and the bosses would correspondingly be about 3/16 inch high. When the lug nuts are secured and tightened down, forces developed at the stud are projected at roughly right angles to the area of contact between the lug nuts and the bosses. This distributes the forces at the stud over a large portion of the disc. Through the use of the bosses, the forces are distributed over an area much larger than that immediately surrounding the lug hole, as in prior art wheels. Forces are thus distributed largely in the area adjacent to, and radially outward from the studs and consequently the center hole of the disc.

The details of the present invention including the details of construction and arrangement of parts, which are hereinafter set forth in the specification and claims, are illustrated by the accompanying drawings, wherein:

Figure 1:
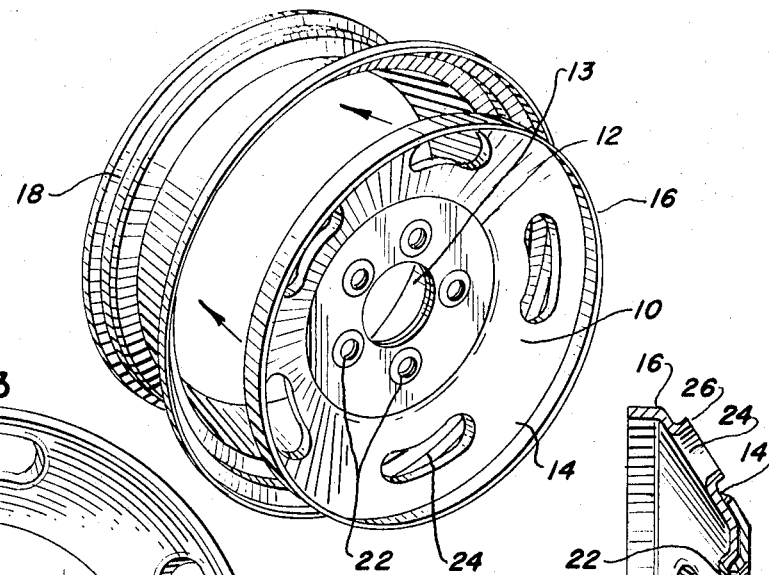
FIG. 1 is a perspective view of a wheel of the present invention showing the wheel center disc separated from, but aligned with, the rim.

In the drawings the wheel center disc is shown generally as 10 which includes a central web portion 12, outer annular portion 14 and outer peripheral flange 16. The rim is shown generally as 18. The disc is inserted in rim 18 and welded thereto, preferably by means of a 360° weld along the edge of flange 16.

Figure 3:
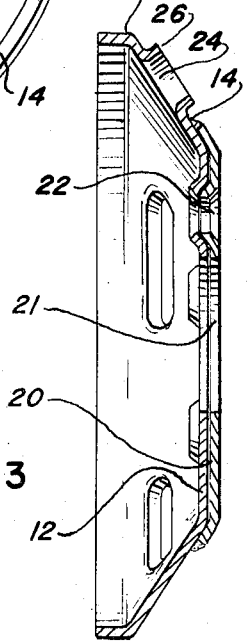
FIG. 3 is a side view of the embodiment shown in FIG. 2 taken in sections at line 3—3 which shows the central web portion, the reinforcing plate, and the outer, annular portion of the disc disposed at an angle from the central web portion.

As is shown in FIG. 3, the central web portion 12 of the disc is substantially flat. The flattened outer, annular portion 14 extends from the central web portion 12, and is offset from the plane thereof at an angle of between 30° and 40°. The outer flange 16 is approximately at right angles to central web portion 12.

As is shown in FIG. 3, the central web portion is reinforced on its back side by reinforcing plate 20 which is preferably of the same thickness as web portion 12. In size, it is coextensive with the area of web portion 12, and overlaps the innermost edge of annular portion 14. Preferably the reinforcing plate 20 is welded to the back of disc 10 with a 360° weld about its periphery.

Figure 2:
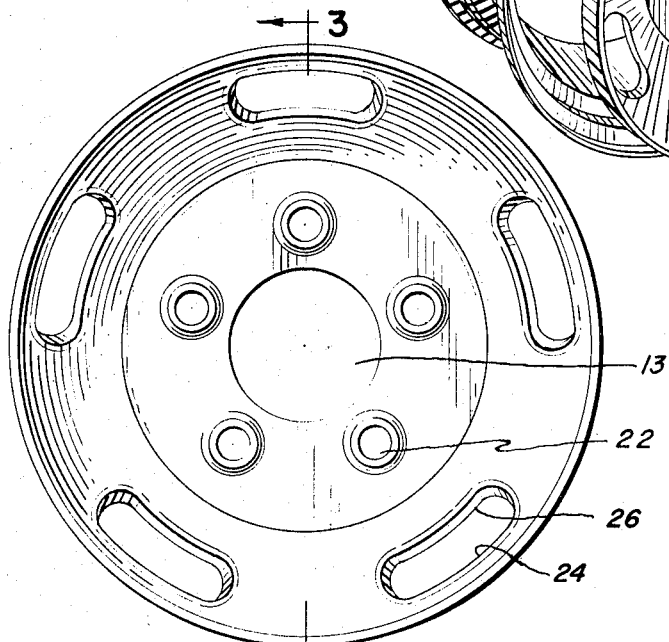
FIG. 2 is a front view of the wheel center disc of the present invention showing the spacing and alignment of the various holes and openings, as well as the coined out bosses.

As is shown in FIGS. 1 and 2, a plurality of stud holes 22 are annularly disposed about the central web portion 12. These holes 22 are adapted to fit over studs protruding from the hub of the axle of a vehicle. As is shown in FIG. 3, corresponding holes exist in both central web portion 12 and in reinforcing plate 20. Surrounding the holes, in both plate 20 and in central web portion 12, are coined-bosses 23. Preferably the bosses 23 are of a height approximately equal to the thickness of the material from which the disc 10 is fabricated. Preferably the bosses 23 are coined in a cold forming operation, whereby the steel is toughened. The bosses 23 are coined in the same direction as the outer portion 16 is offset from the plane of the central web portion 12. It is essential that both the central web portion 12 and the reinforcing plate 20 be coined to the same extent and in the same direction so that the bosses 23, which exist in the central web portion 12 and the plate 20, are in substantial contact throughout. Those skilled in the art will appreciate that the bosses 23 being in substantial contact will help to evenly distribute the forces from the lug area over a wide area of the central web and reinforcing plate.

Central web portion 12 has a central opening 13 through which a portion of the hub extends and plate 20 has a similar opening 21.

As is clearly shown in FIGS. 1 and 2, annular portion 14 of the disc has openings 24 therein. Preferably these openings are elongated at right angles with respect to the radius of the wheel, and most preferably the openings are roughly kidney-shaped. As previously mentioned, it is essential that openings 24 be radially aligned with stud holes to minimize the controlled flexing of annular portion 14.

Further, it is preferable that each opening 24 be equipped with flange 26 which extends generally at right angles to annular portion 14, in a direction generally opposite to the direction of the bosses 23. Thus, flange 26 which surrounds opening 24 preferably extends in a direction opposite to the direction of peripheral flange 16.

Figure 4:
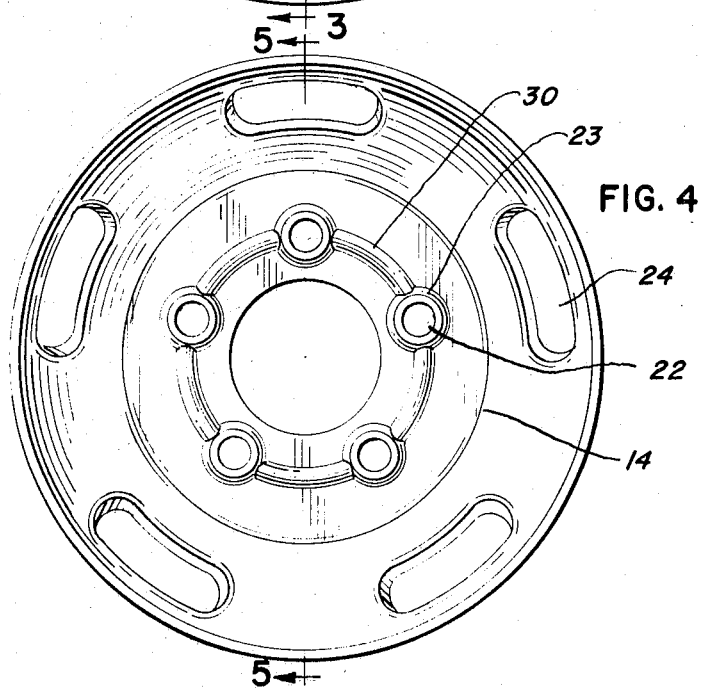
FIG. 4 is a front view of the wheel center disc of the present invention, similar to FIG. 2, but showing a second embodiment with an annular rib connecting the bosses.
Figure 5:
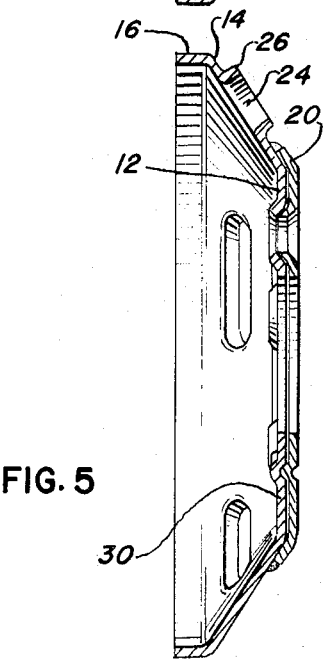
FIG. 5 is a side view of the embodiment of FIG. 4, taken in section at line 5—5.

A second embodiment is illustrated by FIGS. 4 and 5. This embodiment varies from the main embodiment in that annular rib 30 has been formed in the central web portion 12 whereby the annular rib 30 interconnects the bosses 23 which surround the stud holes 22. As is shown by FIG. 5, the annular rib 30 may equal the height of the bosses 23, but similar advantages will be obtained by the use of an annular rib 30 somewhat less than the height of the bosses 23.

It has been found that the use of the annular rib configuration of the second embodiment, whereby the bosses 23 are connected by the annular rib 30, tends to shift the forces at the lug area axially, outward from the center of the disc, providing for more uniform distribution of forces into the outer most portion of central web 12. As in the main embodiment, openings 24 in annular portion 14 are radially aligned with stud openings 22.

In producing the wheel or wheel center of the present invention, some latitude may be had in the materials of construction, although it is considered necessary, in order to obtain maximum advantage of the invention, that the preferred materials be used. It is generally preferred to use a hot rolled 10 percent carbon steel, which has a hardness between 40 and 60 on the Rockwell "B" scale. It is preferred to use steel which is about 3/16 inch thick (0.187 inches), although slightly thicker steel, such as up to 0.25 inches, may be used. Generally it has been found that 3/16 inch steel stock provides sufficient strength, and is desirable over the ¼ inch steel stock because it is lighter. The reinforcing plate should be produced from the same steel stock as the disc member, both as to composition and as to thickness. It has been found that through the use of the reinforcing plate, the 3/16 inch thick steel gives adequate strength for construction of a heavy duty wheel center.

In producing the wheel of the present invention it is essential that the backing plate 20 be greater in diameter than the central web portion 12 and extend over the bend at which the central web portion 12 is joined to the outer portion 14. In a preferred embodiment of a 15 inch wheel, plate 20 extends approximately three-eighths to one-half inch beyond the radius of central web portion 12 onto annular portion 14. It will be appreciated that little or no advantage will be gained by having plate 20 extend much beyond one-half inch as this might interfere with controlled flexing of annular portion 14. Thus, according to the present invention, only a minor portion of annular portion 14 is reinforced by plate 20. As was mentioned above, reinforcing plate 20 is affixed to the disc 10 by welding about its periphery. Preferably the plate 20 is installed on the back side of disc 10, although it may be welded on the front side without dimishing its utility.

Generally the bosses are preferably formed by deep coining without the use of heat. This process toughens the steel and enhances lateral distribution of the forces away from the area immediately contiguous to the stud hole.

It is generally preferred that the surface of the reinforcing plate be substantially flat in order to provide uniform contact with the wheel hub. However, it has been found helpful to depress the central portions of both central web portion 12 and reinforcing plate 20 after welding them together by about 0.020 inches (in the direction of the bosses) so that when the lug nuts are drawn up tight, reinforcing plate 20 is brought into intimate, face to face contact with the wheel hub.

Preferably the boss height is approximately the thickness of the steel stock used to construct the disc. Generally the boss height should range between 0.150 and 0.200 inches when 3/16 inch stock is used to produce the disc.

It has been found that the flange 26 which depends from opening 24 in the annular portion 14 of the disc provides a cooling effect for the braking system which is entirely unexpected. Although the mechanism by which the braking system is cooled is not fully understood, it has been observed, and it is obviously an advantage in a racing wheel.

As was mentioned above, the flat outer portion 14 of the disc must be angularly disposed from the plane of the central web portion 12, and the angle must be between 30° and 40°. Preferably, the angle is approximately 34° in order to achieve maximum strength and controlled flexibility.

The form of invention herein shown and described is to be considered only as illustrative. It will be apparent to those skilled in the art that numerous modifications may be made therein without departure from the spirit of the invention or the scope of the appended claims.

What is claimed is:

1. A heavy duty wheel center disc for use with a wheel rim, said disc having a substantially flat central web portion, and substantially flat outer, annular portion surrounding said central web portion, said central web portion adapted to be bolted to a hub by a plurality of studs arranged in annular series, said central web portion having an annular series of stud holes adapted to receive studs and a coined-out boss surrounding each said hole, said annular outer portion being disposed at an angle between about 30° and 40° from the plane of said central web portion, said outer annular portion having openings radially aligned with and corresponding to each stud hole of the central web portion, each of said openings having a flange projecting from its periphery, said central web portion and annular portion having a reinforcing plate affixed thereto, said reinforcing plate having holes and coined-out bosses surrounding said holes, superimposed on the holes and bosses of said central web portion, said reinforcing plate further being coextensive with said central web portion and a minor portion of said annular outer portion.

2. A wheel center as described in claim 1 wherein said reinforcing plate is welded on the side from which the bosses of the central web portion were coined.

3. A wheel center as described in claim 1 wherein the bosses are approximately the same height as the thickness of the stock from which said central web porrtion and reinforcing plate are fabricated.

4. A wheel center as described in claim 3, wherein said central web portion and reinforcing plate are fabricated from steel approximately 3/16 inch thick.

5. A wheel center as described in claim 4, wherein said central web portion and reinforcing plate are fabricated from hot rolled, 10 percent carbon steel having a hardness between 40 and 60 on the Rockwell "B" scale.

6. A wheel center as described in claim 1, wherein a peripheral flange extends from said annular portion at right angle to said central web portion.

7. A wheel center as described in claim 1, wherein said bosses, on both said central web portion and said reinforcing plate, are connected by an annular rib.

8. A heavy duty wheel comprising a tubular shaped rim affixed to a wheel center disc, said disc having a substantially flat central web portion, and substantially flat outer, annular portion surrounding said central web portion, said central web portion adapted to be bolted to a hub by a plurality of studs arranged in annular series, said central web portion having an annular series of stud holes adapted to receive studs and a coined-out boss surrounding each said hole, said annular outer portion being disposed at an angle between about 30° and 40° from the plane of said central web portion, said outer annular portion having openings radially aligned with and corresponding to each stud hole of the central web portion, each of said openings having a flange projecting from its periphery, said central web portion and annular portion having a reinforcing plate affixed thereto, said reinforcing plate having holes and coined-out bosses surrounding said holes, superimposed on the holes and bosses of said central web portion, said reinforcing plate further being coextensive with said central web portion and a minor portion of said annular outer portion.

9. A wheel as described in claim 8 wherein said reinforcing plate is welded on the side from which the bosses of the central web portion were coined.

10. A wheel as described in claim 8 wherein the bosses are approximately the same height as the thickness of the stock from which said central web portion and reinforcing plate are fabricated.

11. A wheel as described in claim 10 wherein said central web portion and reinforcing plate are fabricated from steel approximately 3/16 inch thick.

12. A wheel as described in claim 11 wherein said central web portion and reinforcing plate are fabricated from hot rolled, 10 percent carbon steel having a hardness between 40 and 60 on the Rockwell "B" scale.

13. A wheel as described in claim 8, wherein a peripheral flange extends from said annular portion at right angle to said central web portion.

14. A wheel as described in claim 8, wherein said bosses, on both said central web portion and said reinforcing plate, are connected by an annular rib.

* * * * *